United States Patent [19]

Greenberg

[11] 3,995,946
[45] Dec. 7, 1976

[54] MOTION PICTURE SOUND FILM APPARATUS

[76] Inventor: A. Frederick Greenberg, 1175 York Ave., New York, N.Y. 10021

[22] Filed: Feb. 27, 1975

[21] Appl. No.: 553,732

[52] U.S. Cl. .................................. 352/129; 352/5; 352/133; 352/6
[51] Int. Cl.² ...................................... G03B 21/00
[58] Field of Search ............ 352/6, 7, 10, 129, 133, 352/5

[56] References Cited
UNITED STATES PATENTS

| | | | |
|---|---|---|---|
| 3,459,472 | 8/1969 | Husted | 352/129 |
| 3,740,125 | 6/1973 | Harris | 352/129 |
| 3,771,860 | 11/1973 | Stone | 352/129 |
| 3,856,389 | 12/1974 | Gardner | 352/129 |

*Primary Examiner*—Monroe H. Hayes

[57] ABSTRACT

A single integrated machine for editing, dubbing, mixing, transferring and resolving on and with a sound motion picture film. The machine contains a first two track audio tape section, a second two track audio tape section and a film transport section including an audio stripe read head. All three of these sections are mechanically coupled together to provide a frame by frame correspondence between audio tracks and film track. The audio tracks are all electronically coupled together to permit transferring of sound from any one audio track to any other audio track on a frame by frame basis. One of the audio tracks is used as a cue track to provide cue signals for the location of scenes and for the transfer of any portion of a scene from one audio track to another selected audio track.

10 Claims, 11 Drawing Figures

MOTION PICTURE SOUND FILM APPARATUS

BACKGROUND OF THE INVENTION

This invention relates in general to the integration in a single machine of a variety of post-filming operations required to convert information on the original film footage and sound tracks into a final film product. The post-filming operations that can be performed in the single machine include resolving, film editing, sound track editing, audio dubbing, audio mixing and audio transfer.

There are a number of known devices to provide one or the other of these functions. However, the task of transforming the raw film footage and raw sound tracks to a final product in which both film and sound have been edited, embellished and made to correspond on a frame by frame basis requires a series of steps that are usually performed in different places by different individuals using a variety of disparate mechanisms.

It would greatly facilitate the creation of a final edited motion picture film if the various post-filming sound and film editing operations required to create the final product could be performed on one machine and at one place.

Accordingly, it is a major purpose of this invention to provide a single editing machine to make available all the above functions and to permit the production of a final edited sound film from the raw film and tape.

Because of the electronic audio consequences of cutting and splicing audio tracks it is a related purpose of this invention to provide a system to eliminate the necessity for the cutting and splicing of audio tapes.

Film editing functions require very accurate correspondence between the frames of film and the corresponding sound. The requirements of the equipment of that provides such correspondence militate against the quality of sound reproduction required when the resolving, mixing, dubbing and transfer of sounds are called for. By contrast, the kinds of equipment which will provide a high quality sound track during resolving, mixing and dubbing and which will also provide a high quality sound when the sound is ultimately transferred to the stripe of a film tend to militate against the type of registration and correspondence requirements required for editing.

Accordingly, it is a further major purpose of this invention to provide a mechanism that provides highly accurate tape to film registration for editing while also providing high quality sound during all audio operations.

All of the above purposes and requirements must be provided in a context that is sufficiently simple to operate as to make it feasible to resolve, edit, dub and transfer without undo distraction due to equipment complexity.

It is further important that the combined functions be performed in a device which is not only relatively simple to operate and offers the convenience of one-site preparation of the final film but which also is sufficiently inexpensive so that its use is warranted by cost considerations.

BRIEF DESCRIPTION OF THE INVENTION

In brief, a preferred embodiment of this invention provides in one machine, two separate tape recording and play back mechanisms as well as a sound film recording and play back mechanism. These three mechanisms are interrelated by a common drive and an electronic system which permits recording the sound from any one sound track onto any other sound track.

The two tape mechanisms are each preferably provided with two tracks and the film mechanism has a single sound track, thereby providing five sound channels. One of the tape sound channels is used for cueing signals. The other four are used to provide independent tracks of audio information which can be combined in order to provide the final sound on the audio stripe of the film.

Each of these three mechanisms has two reels which are reversable. Depending upon the direction being run, a reel will perform either feed or pick-up functions. Each of the six reels has associated with it a separate DC variable speed "torque" motor. For each mechanism, the two associated torque motors are energized to be run in different directions so that if the right hand reel is being torqued clockwise, the left hand reel is being torqued counter-clockwise.

The tape fed between the two reels is threaded through a sprocket drive mechanism. When the sprocket is stationary, the two reels are stationary and the associated torque motors are held stationary. The two torque motors associated with a pair of reels maintain tension at all times on the tape being fed between the two reels so that there is never mechanical slack in the tape or film.

The sprocket drive is powered by a similar type of DC variable speed motor. The sprocket drive motor is driven by a servo-amplifier so that at a given input voltage, the sprocket drive motor will run at a constant speed. The connections to the sprocket drive motor are reversable and the voltage input is variable so that the sprocket drive can be set at any of a range of speeds and can drive the media in either direction. During the transport of the tape or film, as dictated by the sprocket drive motor, the take-up reel torque motor is being allowed to run in the direction dictated by its developed torque while the feed reel motor is being forced to rotate against the bias of its developed torque.

In each mechanism, the two torque motors are connected in series with each other and in series with a current limiting ballast lamp.

The sprocket drives of each of the three mechanisms can be coupled to one another so that they will all rotate at exactly the same speed thereby imparting exactly the same linear speed to each of the media involved. The two tape mechanisms drive sprockets can also be decoupled for certain purposes. The sprocket arrangement assures a convenient frame to frame correspondence between frames of film and frames of tape as well as between corresponding frames of the first tape and the second tape.

The heads associated with each of the four audio channels can be independently switched into either play back or record modes. A mixer arrangement together with its switching controls makes it possible to transfer signals picked up from any one or more of the four audio channels to record them on any of the other audio channels.

One of the tape channels is used to record cueing signals so that the desired transfer of audio between any of the other channels can be precisely determined by a start cueing signal and a stop cueing signal. Thus, through this use of cueing signals and flexible channel transfer arrangement, sound can be edited and additional sound mixed or dubbed-in without requiring physical splicing of tape.

A disk with alternating opaque and transparent radial lines is mounted on the back of one of the tape recorder sprocket shafts. As the shaft rotates, the lines pass between a light source and a photocell to provide a series of pulses, 36 per revolution in one embodiment.

These pulses are provided at an output jack and can then be employed to assure a frame to frame correspondence between the audio track of the outside tape recorder which was used to record the original sound portion of the film being edited. The outside tape recorder has a pulse on the tape corresponding to each frame of original film. The outside tape recorder can then be forced to track with the tape in the editing system that generates the series of pulses. This process is at the heart of the resolution function provided by the system. A phase locked loop or other servo-mechanism is employed for the purpose of comparing the two trains of pulses and forcing one of the two train of pulses to track to the other of the two train of pulses. Thus, frame to frame synchronization between the tape in the editing system and the original film is achieved.

A viewing mechanism is employed in the film path.

DESCRIPTION OF THE PREFERRED EMBODIMENTS

Figure 1:
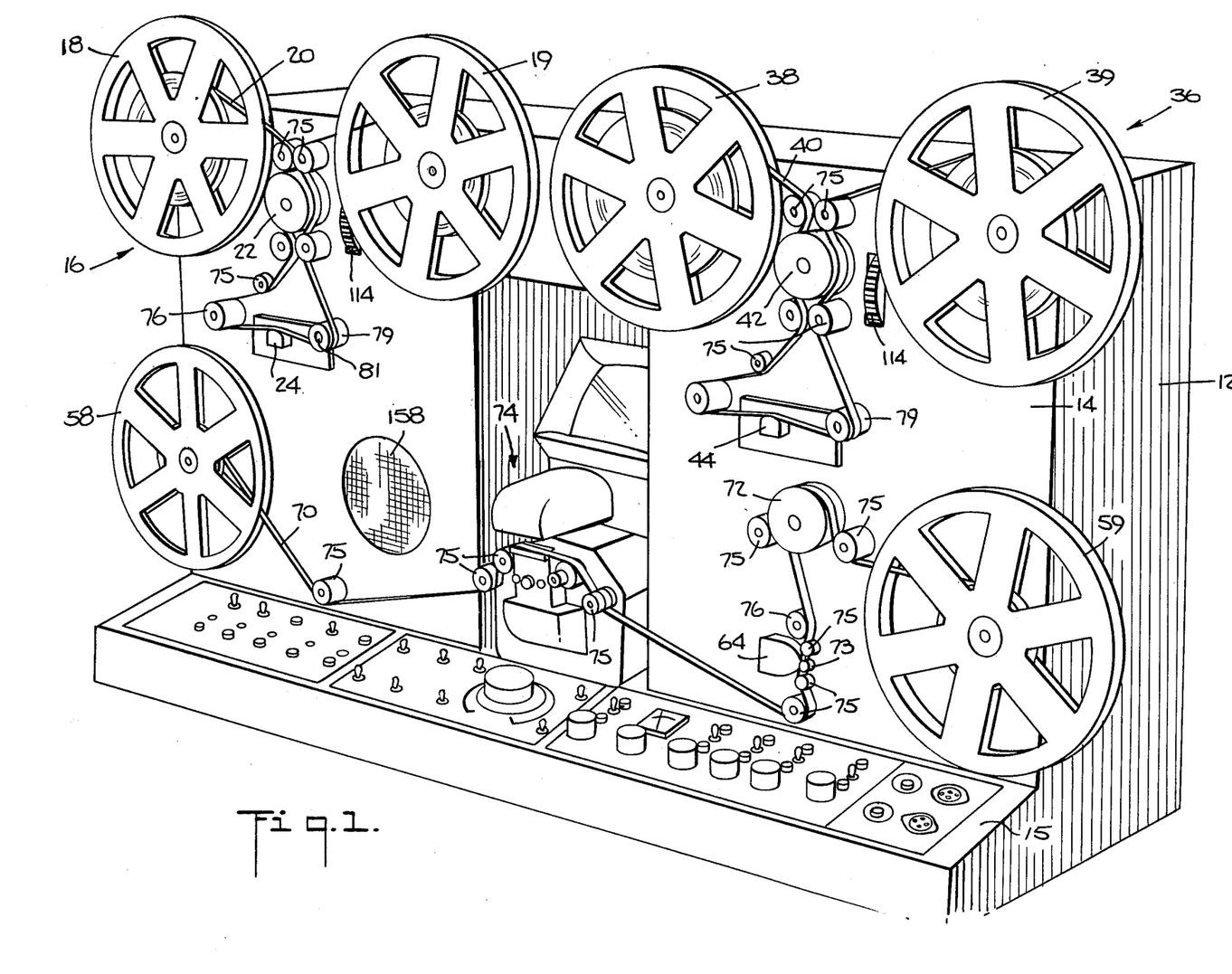
FIG. 1 is a perspective view of the front panel of an embodiment of this invention illustrating first and second magnetic tape recording and playback mechanism as well as a sound film recording and playback mechanism.

The FIGS. all refer to the same embodiment. As shown in FIG. 1, a housing 12 has an upstanding front panel 14 and a substantially horizontal control panel 15. At the upper lefthand portion of the front panel 14, there is a first audio tape mechanism 16. A second audio tape mechanism is at the upper righthand portion of the front panel 14. A sound film mechanism is along the lower portion of the panel 14.

The first audio tape mechanism 16 includes reels 18 and 19 which serve both feed and takeup functions depending on the direction in which the tape 20 is being fed. The tape 20 has a series of sprocket holes adjacent to one longitudinal edge. The sprocket holes engage the sprockets of a sprocket drive 22. The direction of rotation of the sprocket drive 22 determines the direction of transport of the tape 20.

The tape 20 has two audio tracks. A first recording and playback head 24 has two channels and is used to selectively record or play back from either one or both of the tracks on the tape 20. During operation, each of the reels 18 and 19 is continuously mechanically torqued by separate torque motors 26 and 27 respectively (see FIG. 4). The torque motor 26 is mounted on the shaft of the reel 18 and continuously applies torque to the reel 18 in a counterclockwise direction as seen from FIG. 1. Similarly, the torque motor 27 is mounted to the shaft of the reel 19 and continuously applies clockwise (as seen from FIG. 1) torque to the reel 19. The torque maintains continuous tension on the tape 20. Because the sprocket openings in the tape 20 engage the sprockets of the drive 22, the tape 20 will not move in either direction unless the sprocket drive 22 rotates. For example, if sprocket 22 rotates clockwise (again, looking at FIG. 1) the tape 20 will advance from left to right and the reel 18 is a feed reel while the reel 19 is a takeup reel. What will happen is that the sprocket 22 will pull the tape 20 off the feed reel 18 in opposition to the torque applied by the torque motor 26. At the same time, the sprocket 22 will feed tape to the reel 18 thereby permitting the torque motor 27 to turn sufficiently to takeup the tape 20 being fed.

Figure 4:
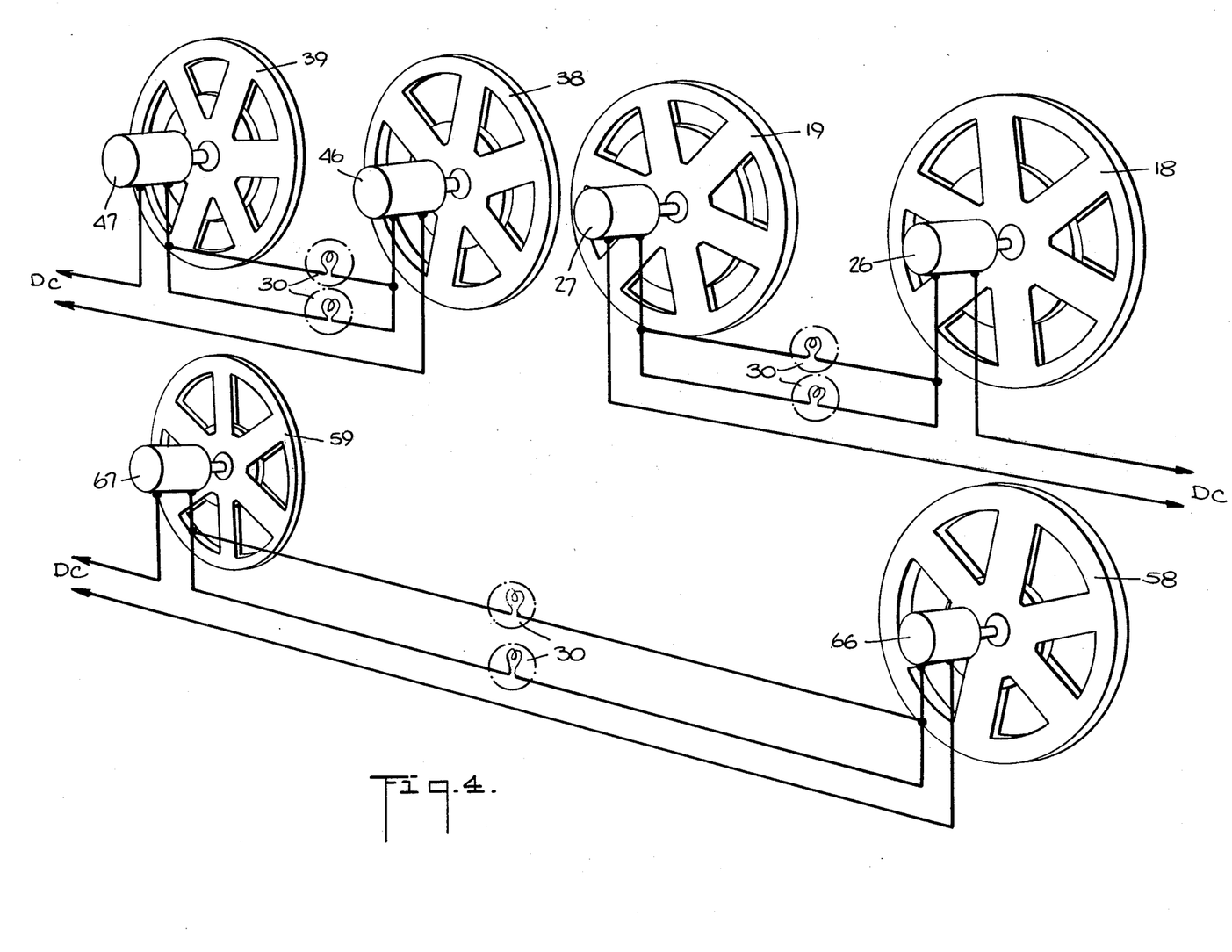
FIG. 4 is an electrical schematic of the torque motor arrangement for maintaining tension on the tape of film media being fed through the three mechanisms illustrated in FIG. 1.

The torque motors 26 and 27 are connected in series with each other and with lamps 30 that operate as ballast to prevent the motors 26 and 27 from burning out when stationary. The motors 26 and 27 are standard direct current motors.

A similar arrangement is provided in connection with the second audio tape mechanism 36 in which reels 38 and 39 feed and takeup two track tape 40. The tape 40 is fed over a second sprocket drive 42. A second recording and playback head 44 has two channels and selectively records on or plays back from either or both of the tracks on the tape 40. Torque motors 46 and 47 are coupled, respectively to the shafts of the reels 38 and 39. These motors 46 and 48 apply counterclockwise and clockwise torque (as seen from FIG. 1), respectively, to reels 38 and 39 to maintain tension on the tape 40.

There is a similar arrangement with respect to the film transport along the lower half of the panel 14. Reels 58 and 59 are held torqued by torque motors 66 and 67 respectively so that the film 70 is held under tension. To achieve this, the torque motor 66 torques the reel 58 in a counterclockwise direction and the torque motor 67 torques the reel 59 in a clockwise direction (as seen from FIG. 1). The sprocket drive 72 is reversible. The direction of rotation of this drive 72 determines the direction of advance of the film 70. The sound stripe on the film 70 passes over a read and playback head 64 so that sound can be either recorded on the film 70 or played back from the film 70. A film viewing mechanism 74 permits operator viewing of the film that is threaded through this mechanism 74.

Various guide rollers 75 are employed throughout to assure proper engagement of the media (film or tape) with the drive sprockets and proper tracking of the media across the record and playback heads. The threading of the media as shown in FIG. 1 is that which is involved during the various editing functions. For fast forward wind or rewind, the tape 20, 40 is disengaged from the sprocket drive 22, 42 and removed from the heads 24, 44. A similar disengagement is made for the film 70 in order to permit fast forward wind or rewind.

In addition to the guide rollers 75, there is a sound drum 76 associated with each of the media 20, 40, 70 and a spring loaded guide roller 79 associated with each of the tapes 20, 40. A pinch roller 73 at the head 64 presses the film 70 against the head 64 so that the magnetic stripe on the film 70 can be read and recorded on.

Figure 6:
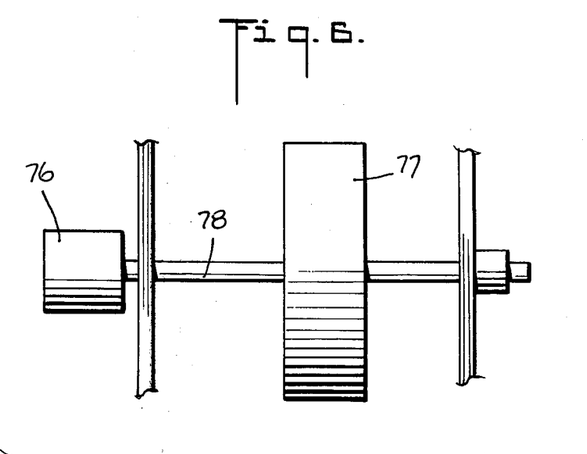
FIG. 6 is a mechanical schematic of the sound drum and fly wheel combination used to assure smooth transport of the media.

FIG. 6 illustrates one of the three sound drum 76, fly wheel 77 combinations. The sound drum 76 and fly wheel 77 are mounted on the same shaft 78. The sound drum 76, fly wheel 77 combination serves to even out variations and perturbations in the travel of the media. These perturbations in the travel of tape and film arise from unevenness in the guide rollers, an out-of-round condition in the guide rollers, and popping of the media as it comes off the sprockets. The sound drum 76 is a smooth metal drum which is carefully machined to be exactly round. The fly wheel 77 to which the drum 76 is mounted is about 2½ pounds. The drum 76 and fly wheel 77 must be mounted accurately co-axially to avoid introducing perturbations. The drum 76 and fly wheel 77 are locked to the shaft 78. The shaft 78, in turn, is rotatably mounted to the frame of the editor.

Figure 7:
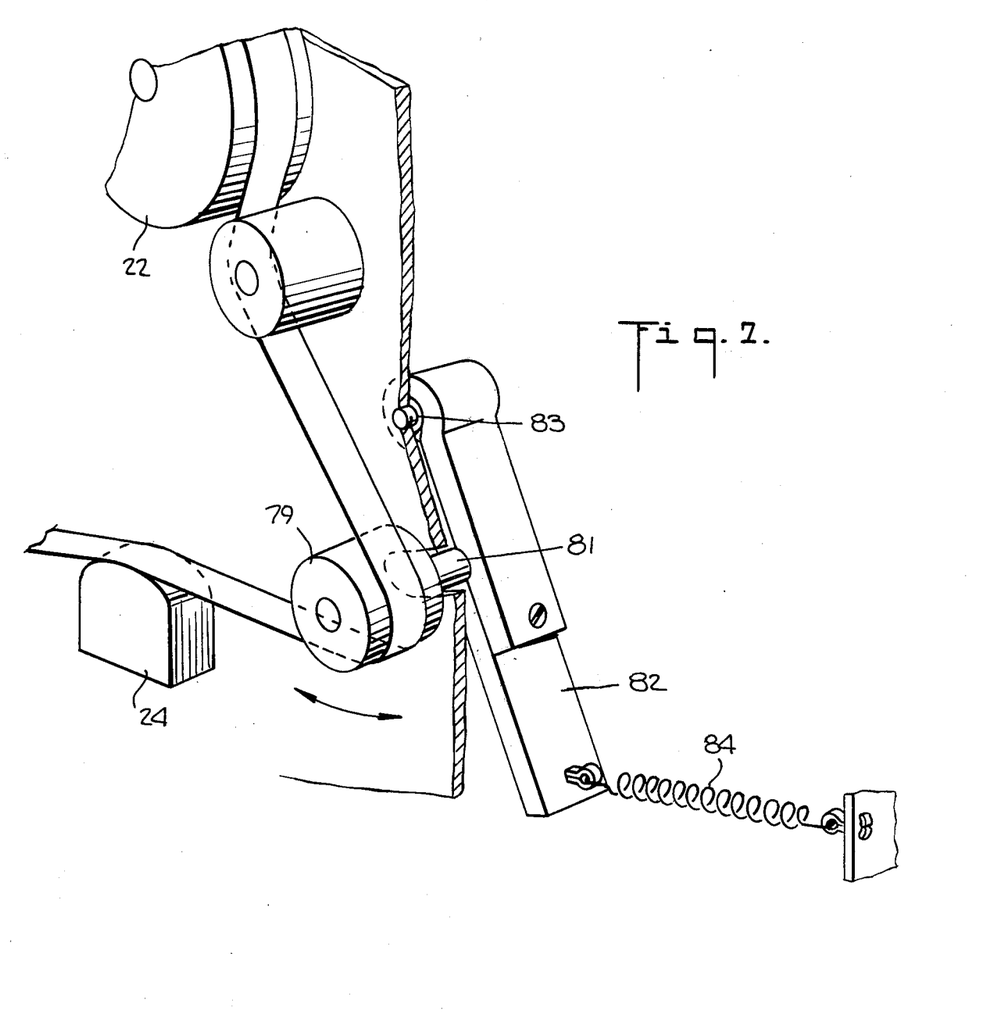
FIG. 7 is a mechanical schematic of the spring loaded guide used to adjust for variations in the length of the loop of tape maintained in the tape transport.

FIG. 7 illustrates one of the two spring loaded guide rollers 79 that serve primarily to adjust for minor differences in the length of tape 20, 40 being fed from one side of the sprocket 22, 42 to the other side of the same sprocket 22, 42. These minor differences in the length of the loop of tape may be due to differences of variations in the pitch between the holes along the edge of the tape. It is important that the spring loaded guide 79 maintain the orientaion of its axis as it moves to adjust for changes in the length of the loop of tape. That is, it is important that when a guide roller 79 moves, the movement be a translation maintaining the orientation of its axis. If the guide roller 79 rocks or pivots, then the feed of the tape 20 or 40 over the playback and recording head 24 or 44 will be distorted. As shown in FIG. 7, the guide roller 79 is rotatably mounted on a shaft 80 that extends forward from a central portion of a lever arm 82. The lever arm 82 is pivoted at one end 83 for limited rotational movement about that pivot point. A spring 84 at the other end of the lever 82 biases the lever 82 in a direction that tends to maintain tension on the tape threaded around the guide roller 79. The shaft 81 is perpendicular to the plane in which the lever arm rotates and thus the axis of the guide roller 79 remains perpendicular to the plane of rotation of the lever 82. Accordingly, the guide roller 79 maintains the required constant orientaion to the path of travel of the tape as the guide roller 79 shifts laterally in response to small variations in the length of tape 20 or 40 looped from one side to the other of the sprocket drive 22 or 42.

Figures 2, 3:
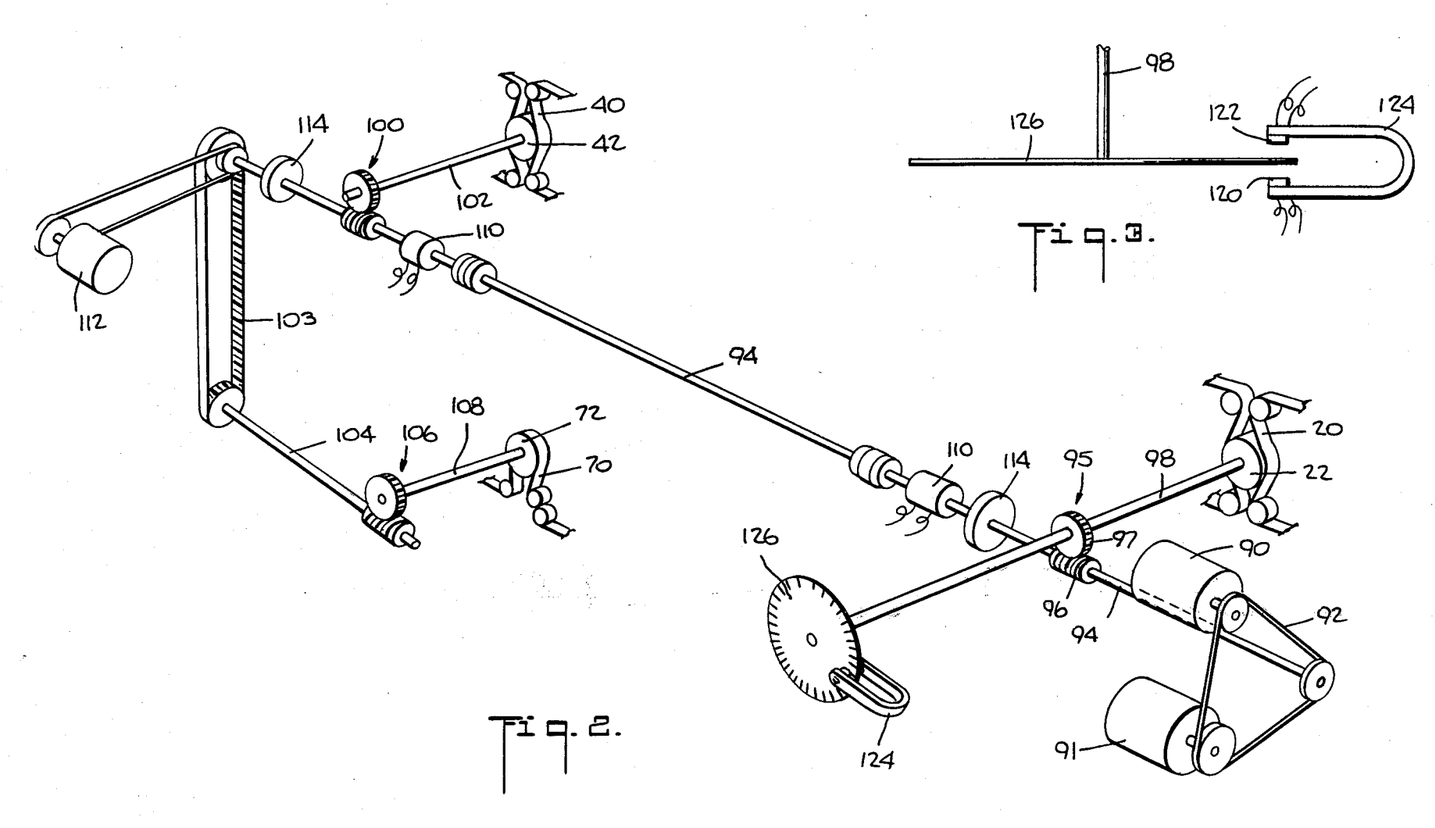
FIG. 2 is an isometric mechanical schematic of the sprocket drive mechanisms for the three sprockets that drive respectively the three mechanisms shown in FIG. 1 FIG. 2 also shows the electro-optical element for generating the train of pulses used for resolution.
FIG. 3 is a top view of the electro-optical resolution pulse generating mechanism shown in FIG. 2.
Figure 5A:
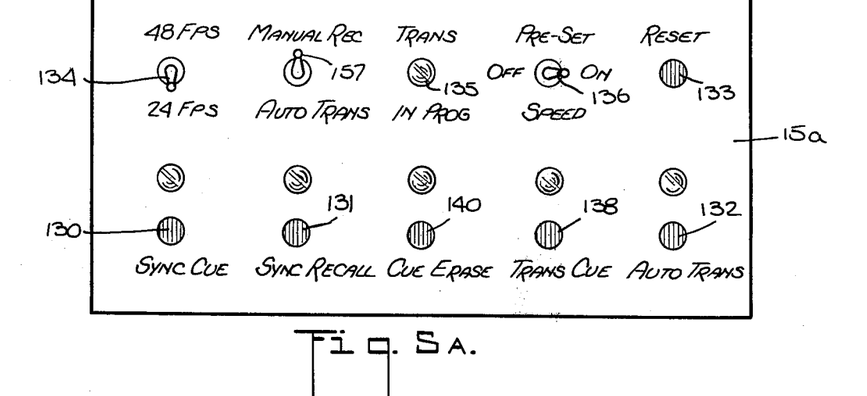
FIGS. 5A, 5B and 5C illustrate the function switches, control knobs and indicator lights on the front panel.
Figure 5B:
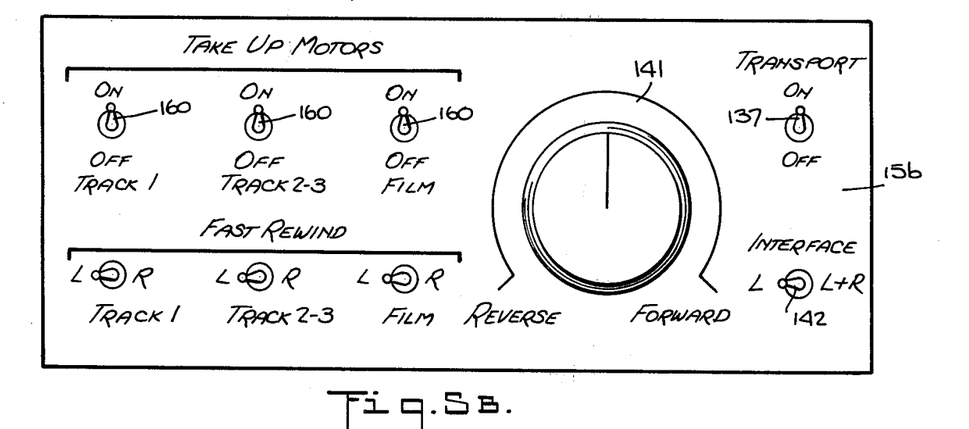

FIG. 2 is a perspective mechanical schematic illustrating the drive for the three sprockets 22, 42 and 72. Motors 90 and 91 through a belt drive 92, drive a main shaft 94 at about 2200 r.p.m. As the shaft 94 rotates, a gear arrangement 95, comprising a worm 96 and worm wheel 97, at a 20 to 1 reduction, drives the shaft 98 on which the sprocket 22 is mounted. A similar gear arrangement 100 drives the shaft 102 on which the second srocket 42 is mounted. Through a second belt 103, the shaft 94 drives a further shaft 104 and in turn through a gear arrangement 106 drives the shaft 108 on which the film drive sprocket 72 is mounted. A solenoid actuated clutch mechanism 110 permits operator disengagement of the left and right hand portion to the main shaft 94. When disengaged, the motor 112 can be used to drive the sprockets 42 and 72 independently of whether or not the sprocket 22 is being driven. The interface switch 142 on the panel 15b (see FIG. 5B) control energization of the solenoid.

Thus all three sprocket drives 22, 42 and 72 can be driven in synchronism so that the tape 20, the tape 40 and the film 70 can be advanced in synchronism. However, where desired, the tape 20 can be decoupled from this synchronous arrangement.

Thumb operated knobs 114 are mounted on the shaft 94 and project through the front panel 14. These knobs 114 are called inching knobs. They permit the operator to manually advance or back up the sound tape 20, 40 and/or film 70 on a frame-by-frame basis.

With reference to FIGS. 2 and 3, a light responsive cell 120 and light source 122 are held facing one another on U-shaped frame 124. A transparent disc 126 mounted on the shaft 98 has 36 evenly spced opaque lines aong its edge. As the disc 126 rotates, the lines pass between the light source 122 and photo cell 120 to provide a series of pulse outputs from the photo cell 120. Th pulse train thus developed in made available at the sync resolve terminal 127 on the front panel section 15c (see FIG. 5C). It can then be used as a standard to assure that an external audio input is transferred to the tape 20 on a frame-by-frame basis. This is paticularly important when the raw footage of audio is being first fed in to the editor.

The operating flexibility provided by this invention can best be understood by reference to the functions available through the control panel 15. The control panel 15 is conveniently divided into three sections which are shown respectively in FIGS. 5A, 5B and 5C. The first control panel section 15a can conveniently be termed as the panel that contains the editing controls. The second control panel 15b can be termed the panel that contains the transport controls. The third control panel 15c contains the audio controls.

The operation of this invention can profitably be understood as centering around certain cue signals. These cue signals are used to identify or locate sections or positions of the audio tracks so that audio information can be transferred, erased and/or inserted. The placing and locating of these cue signals is important. There are two types of cue signals. One is termed herein a sync cue signal and the other is termed herein a transfer cue signal.

The sprocket drives are all driven from an interconnected set of shafts 94, 98, 102 and 108. This means that the two tapes 20 and 40 and the film 70 can be processed with a frame for frame correspondence. Thus, as the tapes and film are driven back and forth, corresponding locations at the three audio heads 24, 44 and 64 always remain in the same correspondence. The viewing mechanism 74 and the film audio head 64 of necessity operate on different portions of the film 70. But there is a constant length of film between the film frame in the gate of the viewer 74 and the film frame at the reading head 64. Thus there is a further frame correspondence between the film frame viewed and the audio frames on all five audio tracks. Because of this correspondence between the three media 20, 40 and 70, one of the two tracks on the audio tape 20 can be and is used as the cueing track. On this cueing track all of the cue signals are placed. Thus, the head 24 is used to place the sync cue signals and transfer cue signals on this cue track and the head 24 is used to read off the cue signals when locating cued audio segments.

The editing of film is essentially on a scene by scene basis. As is known in the art, a correspondence has to be established between the raw footage of film and the raw footage of tape on a scene by scene basis. The clap-mark accompanied by a spoken indication of scene and take numbers together with the chalk board indication of scene and take numbers are techniques used to provide this kind of correspondence. The device of this invention can be ued when editing from raw footage used provide frame by frame synchronization within each scene even though the raw footage does not have such synchronization. This invention is also used, once frame by frame synchronization has been achieved, to provide further editing of the film. The editing involved includes the selection and rejection of scenes and also the rearranging of scenes. In cases where a very large percentage of the raw footage shot is to be rejected, the film maker may be able to initially cut out large sections of film and tape and splice together the remaining sections before even using the device of this invention. However, the editing device illustrated herein has a flexibility that permits the film maker to use the device of this invention to edit from completely unedited raw film, to edit from partially edited film, to do the fine editing that provides the final film sequence, to edit film which is initially shot with lip synchronization and to edit film where such frame-by-frame synchronization is not required. The frame-by-frame correspondence provided by the device of this invention is useful even where lip synchronization is not involved because it means that once a scene has been selected and edited, the visual and audio portions of that scene will remain in the selected correspondence throughout all subsequent editing sequences.

To understand how the editor disclosed may be used, a typical editing routine is reviewed herein. The following editing routine assumes that some initial editing has been had so that within individual scenes, there is frame-by-frame correspondence between the frames of the scene on the film 70 and the frames of the scene on the full coat tape 20.

In brief, the sync cue signal is used to locate and identify the corresponding film and audio segments constituting a scene. The operator places a sync cue signal near the center of each scene that is to be kept. The sync cue signal is on one track of the tape 20. But because all the media are locked to one another on a frame-by-frame basis, location of the sync cue signal serves to locate the corresponding audio and film segments. Because the sync cue is used to locate a scene, it is preferably placed at the center of a scene or at a frame that is sure to be kept even if the scene is edited down.

In brief, a transfer cue signal is placed at the beginning frame and at the end frame of each scene that is to be kept at whatever stage of editing is involved. The sync cue is used to locate a desired scene. Once located, the editor device is run back to before the beginning transfer cue and then ran forward. The first transfer cue causes the audio portion of the cene to be automatically transferred from tape 20 to one of the tracks on tape 40. The second transfer cue stops the transfer and also shuts off the transport of media.

Thus it should be kept in mind that a transfer cue precisely brackets the scene to be transferred and a sync cue signal is roughly centered on the scene to be transferred. With this basic understanding, the following detailed description of the operation and use of the two cue signals can better be understood.

Because of the sprocket drive arrangement, the tape 20 and the film 70 are maintained in a frame-for-frame correspondence as the transport are run. The speed selection switch 134 is normally thrown to 24 frames per second and the pre-set speed switch 136 is thrown to "on" so that the operator by use of the transport switch 137 turns the transport drive on and off (see FIGS. 5A and 5B).

The film 70 is run and the operator determines which scenes he may wish to keep for the final film. At approximately the center point in each scene and while the media 20, 70 are in motion, the operator pushes the sync cue button 130 (see FIG. 5A) and imposes a 600 Herz tone on the cue track. The actuation of the sync cue signal automatically stops the transport and the operator places a grease pencil mark on the frame of film in the gate of the viewer 74. This is done for each of the scenes that the operator desires to keep. The operator must keep a corresponding sync cue chart indicating by numerical sequence which film scene corresponds to which sync cue signal in numerical sequence.

At each selected scene, the operator runs the film 70 and tape 20 back to the beginning frame of the scene. Running the media in reverse required throwing the pre-set speed switch 136 to "off" and using the manual variable speed knob 141. At the beginning frame of the scene, the operator actuates the transfer cue button 138 and thereby places a transfer cue signal at the corresponding frame of the cue track. The operator then runs to the last frame of the scene and hits the transfer cue button 138 again. Thus each sync cue signal is bracketed by a pair of transfer cue signals.

The transfer cue signal is applied while the tape 20 is stationary. For that reason, a preferred implementation of the transfer cue signal is in the erasure of a signal. At each scene selected, the operator first runs the scene through with the cue erase 140 button actuated. Thi places a 2.4 KHz (2400 Herz) tone along the cue track. Subsequent application of the sync cue 600 Herz tone automatically erases this 2.4 KHz tone over the length of track to which the sync cue is applied. Actuation of the transfer cue 138 button activates the erase portion of the head 24 and places a gap in the 2.4 KHz tone on the cue track. The editor mechanism during the transfer sequence responds to the gap (that is, the termination of signal) to initiate and terminate audio transfer.

The operator then physically cuts the film 70 and arranges the scenes in the desired sequence. However, the operator's sync cue chart tells the operator which sync cue signal in numerical sequence corresponds to each of the film scenes. After the selected film scenes have been cut out, rearranged and spliced to provide the next generation film strip 70, then the following routine is followed in order to create a corresponding sequence of audio scenes on one of the tracks of the tape 40.

First, the marked center frame of the first film scene is placed in the gate of the viewer. The lefthand tape transport 16 is decoupled through actuation of the interface switch 142. The left transport is then run forward by actuation of the sync recall button 131. If, as is often the case, the corresponding audio scene is not the first scene having a sync cue, then the sync recall button 131 is hit as many times as as necessary to locate the appropriate audio scene. The number of times the sync recall button 131 has to be hit is determined by reference to the sync cue sheet that was prepared when the sync cue signals were initially impressed. Upon locating the corresponding audio scene, the interface switch 142 is thrown to the on position to energize the solenoid clutch 110 and thus recouple the transport 16. With all transports now locked together on a frame-by-frame basis, the media is run in reverse to some point before the first frame of the scene segment to be kept and thus to before the first transfer cue. The automatic transfer button 132 is actuated. The machine will then automatically advance to that signal by coupling in an audio transfer amplifier to transfer the audio information from the track on tape 20 to a selected track on tape 40. In response to the second transfer cue signal, the audio transfer amplifier will be disabled and the transport will stop. During this transfer of audio function a light 135 indicates such to the operator. The light 135 turns on in response to the first transfer cue signal and turns off in response to the second transfer cue signal.

The operator then advances the film 70 to the marked central frame of the second scene, decouples the tape transport 16 and repeats the above routine to thereby transfer a corresponding second audio scene to the tape 40 at a position adjacent to the first audio scene on the tape 40. In this fashion, on a scene-by-scene basis, corresponding film and audio scenes are synchronized at a frame-to-frame level to provide the next generation film 70 and the next generation tape 40 which eliminates much of the material (frequently as much as 90% of the raw footage shot) that is not to appear in the final product.

The above editing technique is repeated for a finer cut until a final cut is obtained. At each subsequent editing cut additional amounts of corresponding film and audio material are eliminated.

In subsequent editing, the tape 40 developed in the righthand transport 36 can be edited over to the lefthand transport 16 to create the next generation of edited tape. As long as the interlock of media is maintained, the cue track on tape 20 can be used to cue in audio scenes from any of the audio tracks.

Since the transfer is repeated with each generation of editing, the addition of a film and audio scene can also be conveniently done by splicing in the film scene, placing the corresponding audio scene at the end of the tape 40 and then when that tape becomes the new generation tape 20 transferring it to the appropriate location on the new tape 40. The cue chart can be maintained to assist the operator in locating the film scene that corresponds to the audio scene added to the end of the tape.

The transfer cue which is a gap in the 2.4 KHz signal is created by the erase head on the cue track. When the transfer cue button 138 is hit not only is the erase head 24 actuated but the tape 20 is moved ahead by applying a pulse to the drive mechanism that causes the drive mechanism to move for a small fraction of a second representing about six frames. During this six frame transport, the erase head mechanism is turned on and off so that the actual erasure is only for a fraction of a frame even though the film is advanced by virtue of the one-shot pulse for about six frames. The erase head itself is so small in size that the film must be moved over the erase head in order to assure a meaningful gap in the 2.4 KHz signal. Thus the amount of gap is sufficient to assure a transfer cue to which the machine will respond. The erase head is actuated during the initial portion of this six frame transport so that the gap which is the transfer cue occurs at the selected frame.

At certain stages of editing, particularly at the earlier stages, there may be times when the film is being edited down without any transfer of sound from the tape 20 to the tape 40. During such procedures, the routine to be followed differs somewhat from the one described above in that there is no need to apply the transfer cue signals.

The operator may have to establish an initial synchronization between the film 70 and tape 20 before locking in that synchronization on a frame-by-frame basis. For example, the clap mark on the film 70 that identifies scene 13, take 6 will have a corresponding voice calling out scene 13, take 6 on the tape 20. The frame of tape where the clap mark is heard is located by disengaging the shaft coupling 110 and by rethreading the tape without the sprocket 22. Then by manually rocking the reels 18 and 19, the clap mark can be heard and the frame located over the record head 14. That frame is then marked with a grease pencil for later visual location. The corresponding visual clap mark indication is then independently positioned in the gate of the viewer 74. Then the sprocket drives are coupled together so that frame-to-frame correspondence between tape and film is maintained while the rest of that scene is processed by the above-described routine of imposing cue signals and transferring the sound track while cutting out the film track. If the film and sound are shot with lip synchronization, then the pulse which is generated by the disc 126 for each frame of tape 20 can be used to make sure the raw footage of cassette tape, which was shot in synchronization with the film, is transcribed onto the full coat tape 20 on a corresponding frame-by-frame basis. Thus, by virtue of the pulse train generated through the use of the disc 126 each frame of tape shot in a lip synchronous mode is transferred to a separate individual frame of tape on the full coat 20.

In the final transfer, the audio is placed on the magnetic stripe of the film so that the audio leads the corresponding film frame by 18 frames. This transfer is made by marking the corresponding audio and film frames just prior to the final transfer and then counting 18 frames from the film frame at the gate of the viewer 74, marking that eighteenth frame and then placing that eighteenth frame on the film sound head 64. Then the transfer can proceed and the audio will be transferred to the stripe of the film with the correct 18 frame displacement from the corresponding film frame.

The 2.4 KHz signal is put onto the tape by running the tape through actuation of the cue erase button 140. This signal is put onto the cue track usually only over that range of the tape where it is desired to do some editing. The proportion of the raw footage which would be used even after the first series of cuts tends to be a fairly small proportion and there is no need to impose the 2.4 KHz signal over the entire raw footage. This button 140 is called cue erase because it will erase any sync cue signals as well as any transfer cue gaps on the tape segment to which the 2.4 KHz signal is applied.

The sync recall button 131 is connected to a set-reset flip-flop such that when the sync recall button is hit it puts the flip-flop into its set state thereby turning on a transport relay. This permits the operator to advance the media by simply actuating the sync recall button 131. A reset signal is generated in response to detecting a sync cue signal and this reset signal is applied to reset the flip-flop and thus turn off the transport.

When the sync cue button 130 is hit is places the sync cue signal on the tape. The button 130 however also sets the flip-flop associated with the sync recall button 131 so that the tape transport is automatically turned off in response to the reading of the sync cue signal that is being placed on the tape.

The reset button 133 serves to apply a signal to the reset input of all of the flip-flops used in the control circuit. Thus, the reset button 133 operates as a "panic" button in that it stops the machine. More particularly, the reset button performs the important function of preventing the machine from running continuously when the sync recall button 131 is pressed when there is no sync cue to stop the transport or when the automatic transfer button 132 is pressed when there is no transfer cue to stop the transport. The operator simply hits the reset button 133 and the transport will stop. The reset button is equivalent to turning the machine off in terms of setting the machine at neutral so that when turned on again the various functions that have previously been put into the machine do not operate and the operator can initiate whatever functions the operator desires at that point.

Figure 8:
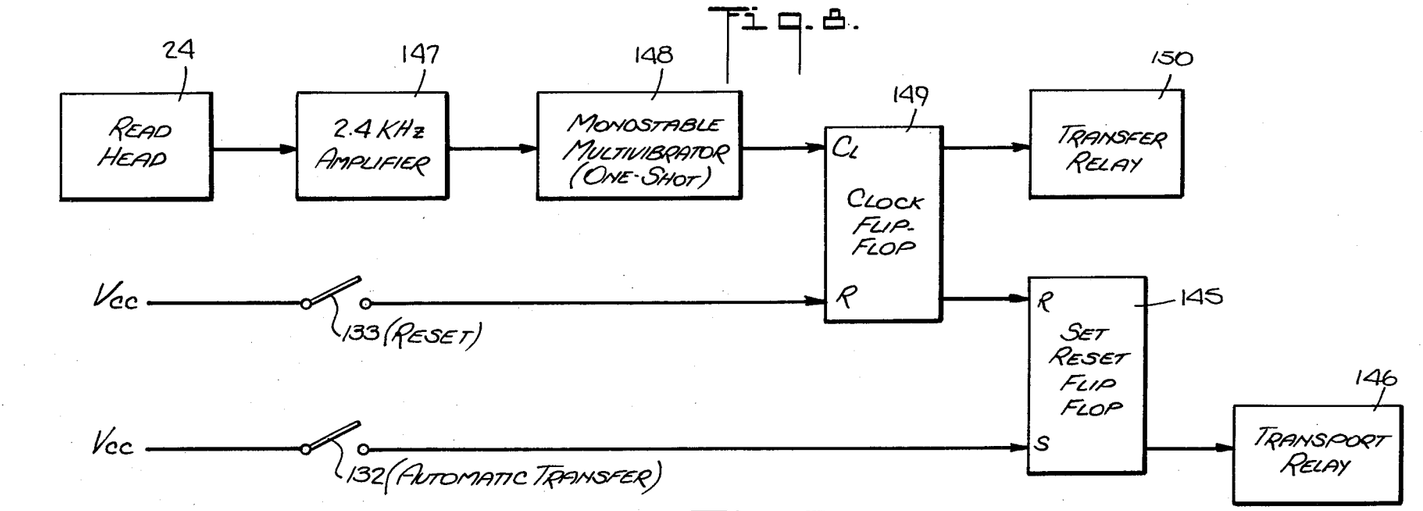
FIG. 8 is a block diagram of the electrical circuit actuated by the automatic transfer switch.

The automatic transfer operation initiated by actuation of the automatic transfer button 132 can be more completely understood with reference to the FIG. 8 block diagram. When the operator hits the automatic transfer button 132, (indicated as the switch 132 in FIG. 8) the switch 132 is closed thereby applying voltage to the set input of the set-reset flip-flop 145. This throws the flip-flop 145 into its set state and provides an output which actuates the transport relay circuitry 146 and thus causes the media to advance. As the media advances, the left transport read head 24 reads the cue track to provide a 2.4 KHz signal that is amplified by an amplifier 147 and applied to a monostable multivibrator 148, commonly called a one-shot. This one-shot 148 has a relaxation time period greater than the cycle duration of a 600 Herz signal. Thus, as long as the 2.4 KHz signal or the 600 Herz sync cue signal is applied to one-shot 148, one-shot 148 is maintained in its on state. The output of one-shot 148 is maintained in its one state. The output of the one-shot 148 is applied to the clock input of a clock flip-flop 149. The flip-flop 149 is designed to clock on a trailing edge or negative going pulse. Thus when the equipment starts up through energization of the transport relay circuit 146, the turning on or going high of the one-shot 148 does not affect the clock flip-flop 149. However, as soon as the first gap in the 2.4 KHz signal is reached, the one-shot 148 falls back to its stable off state thereby applying a negative going pulse to the clock input of the flip-flop 149 and switching the flip-flop 149 to a state which provides an output that energizes the transfer relay circuity 150. With the circuity 150 turned on, the transfer amplifier is turned on and the audio signal on the tape 20 is transferred to whichever channel of the tape 40 is switched into the output of the transfer circuity. The picking up of the 2.4 KHz signal after the transfer cue gap has been passed does not change the state of the circuity shown in FIG. 8 because that involves turning on the one-shot 148 and providing a positive going pulse at the clock input of the flip-flop 149. However, at the second transfer cue, the gap in the 2.4 KHz signal causes the one-shot 148 to turn off thereby providing a second negative going pulse input to the clock terminal of the flip-flop 149 and forcing the flip-flop 149 to switch state. Since the flip-flop 149, at this point, has been in the output state which turns on the transfer relay circuit 150, the switch of state of the flip-flop 149 turns off the transfer relay circuit 150 and applies an input to the reset terminal of the set-reset flip-flop 145. As a consequence the flip-flop 145 is switched in state and the transport relay circuity 146 is also turned off.

The sequence is repeated for each segment of the tape 20 that it is desired to transfer to the tape 40. When initiating a series of transfers, the operator may find it prudent to actuate the reset button 133, thereby applying voltage to the reset terminal of clock flip-flop 149 so as to assure that the flip-flop 149 has the desired initial state.

The pre-set speed on-off switch 136 is interlocked with the speed selection switch 134 and manual variable speed control knob 141. When the switch 136 is on, the knob 141 function is disabled and the transports can only run at the speed selected by the switch 134. When the switch 136 is off, the switch 134 function is disabled and the operator can select any desired speed in either direction by use of the knob 141. In either case, the transport switch 137 must be on for any transport function to proceed. Throwing the transport switch 137 into its off position will stop everything from running but does not serve to reset the sync recall or auto transfer functions because it only turns power off to the motors. The reset button 133 has to be actuated to reset those functions. Of course, shutting all power off to the editor will also reset those functions.

Figure 5C:
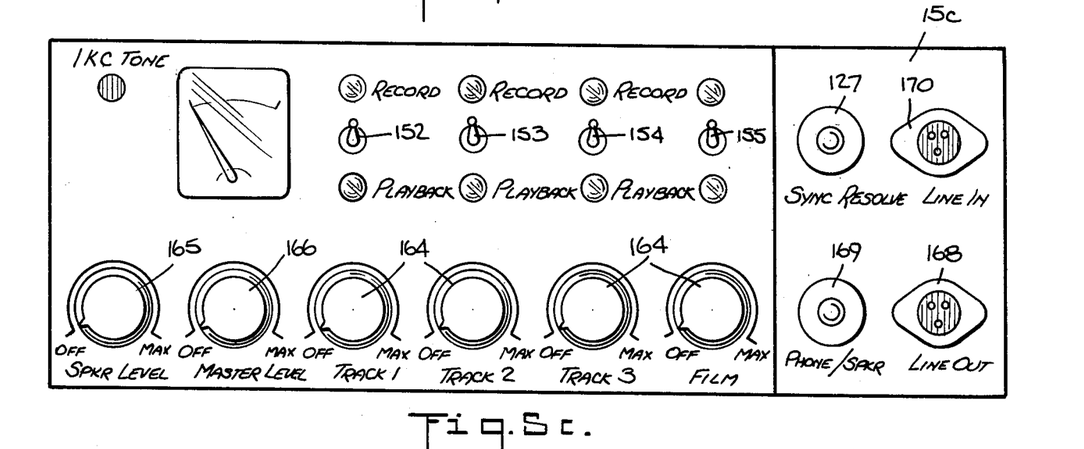

The four record/playback switches 152, 153, 154, 155 shown in FIG. 5C place the various heads in either a record or a playback condition. In particular the switches 152–155 set the heads with respect to the four audio tracks as indicated under the corresponding audio volume control knobs 164. There is no record/playback switch on the panel for the cue track. Switch 152 offsets track 1, which track is the non-cue track of tape 20. Switch 153 affects track 2 which is one of the two tracks on tape 40. Switch 154 affects track 3 which is the other track on tape 40. Switch 155 affects the film stripe track. As to each of the switches 152–155, when in the playback position, the corresponding volume control knob 164 is adjusted to whatever volume position is desired by the operator. When in the record position, the corresponding volume control knob 164 is turned off. Any number of the four audio tracks can be in the playback mode at the same time and any number of the four audio tracks can be in the record mode at the same time. Any desired combination of record and playback tracks can be selected. Any combination can be selected because, as shown in FIG. 9, each switch 152–155 when thrown to record couples the corresponding head to the output of a common mixer circuit and when thrown to playback couples the corresponding head to the input of the common mixer circuit.

The six volume control knobs 164, 165, 166 (see FIG. 5C) operate on the audio volume. In practice, the four volume control knobs 164 for the three audio tape tracks and for the film stripe are used to create various desired proportions of the sound provided by the various tracks. The speaker level knob 185 determines the overall audio volume. The four knobs 164 for the four tracks affect the volume of the signal transferred. The master level knob 166 performs a function similar to that of the speaker level knob 165 except that the master level knob 166 is for internal transfer and the speaker level knob 165 is for the output from the speaker 158 that is presented to the operator. For example if the operator is transferring from tracks one and three to the film stripe, and wishes to set the level from track one to one-half the level from track three, then the track one and track three knobs 164 would be set to provide that ratio between the outputs of the two tracks. In addition, the master level knob 166 would be set to provide the total volume level desired on the film stripe.

Figure 9:
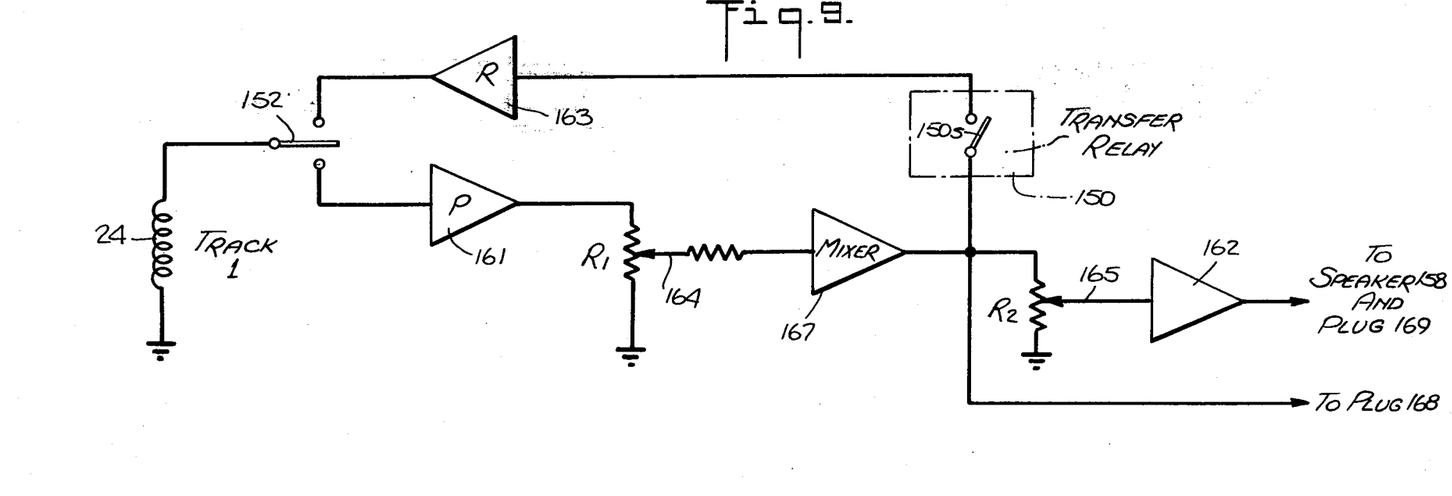
FIG. 9 is a schematic and block diagram illustrating the relationship between the audio mixer and the read and playback head.

FIG. 9 illustrates the audio connections between the head 24 of track one and the mixer 167. A similar arrangement exists for each of the four audio tracks. The switch 152 when thrown to playback applies the head 24 output through a preamplifier 161 across a resistor R1. The corresponding knob 164 selects the level of input to the mixer 167. The mixer 167 output is applied across resistor R2 to the input of an internal amplifier 162 that then provides an input to the speaker 158 and input to the phone/speaker plug 169. The knob 165 selects the level of input to the amplifier 162. The switch 152 when thrown to record, connects the head 24 through an isolating amplifier 163 and switch 150s to the output of the mixer 167. This connection is made only when the auto transfer relay 150 is turned on because such closes the switch 150s.

Other inputs to the mixer 167 are available from each of the other three audio tracks and from the live-in plug 170. The output from the mixer 167 is made available to each of the other three audio tracks, dependent on the position of the switches 153, 154 and 155.

The manual record/auto transfer switch 157 performs the following functions. When in manual record, the switch connects power to the speaker 158 so that whatever is being played will be heard. When in auto transfer, the switch 157 disables the speaker 158 such that the speaker 158 can be enabled only in response to a signal generated when the first transfer cue in a transfer mode function is read by the head 24. Thus the operator, in the latter mode, will hear only the audio being transferred.

The interface switch 142 on the center panel 156 operates the clutch 110. It is a two position switch. In left position, the clutch 110 is de-energized so that only the left transport 16 operates. In the right position the clutch 110 is energized so that all three transports operate together.

A common use for the torque motor turnoff switches 160 (see FIG. 5B) is where the operator is running tape 20 only on the lefthand transport and is also running film 70. Under those conditions it is necessary to turn off the torque motors 46, 47 for the right hand transport to prevent the reels 38, 39 on the right hand transport from running away. During the loading of film or tape, it is frequently necessary to have the torque motors out of operation. During the transfer of sound from one tape to the other tape, it will be necessary to have the film torque motors 66, 67 turned off. For these and other reasons, there are three separate torque motor turnoff switches 160 on the center panel 15b to allow the operator to separately turn off the motors for each of the three transport systems.

The 1 KC tone (on panel 15c) provides a standard signal for the purpose of providing a reference volume for recording.

The line-out plug 168 provides the output sound from the mixer without amplification while phones/-speaker plug 169 provides the output using internal amplification.

The sync resolve 127 provides a pulse for each frame and is used as a means to synchronize the internal audio tracks to an external audio track. It is used in connection either with the line-out plug 168 or the line-in plug 170. When used with line-in 170, the sync resolve 127 provides a one pulse per frame train output to control the external source of audio at a speed which will provide a corresponding frame-by-frame audio input. When used with the line-out 168, the train of output pulses from sync resolve 127 runs the recorder that is receiving audio from this editing system at a speed such that the external recorded will be receiving audio on a frame-by-frame basis (that is, frame of audio for each frame of film).

What is claimed is:

1. A motion picture sound film apparatus for editing, mixing and dubbing comprising:
   a first multi-track tape recording and play back mechanism including first and second reversible feed/take-up reels and first recording and play back head,
   a second tape recording and play back mechanism including third and fourth reversible feed/take-up reels and second recording and play back head,
   a film viewing mechanism including fifth and sixth reversible feed/take-up reels, a third recording and play back head, and projection means for projecting the impage of film being fed between said fifth and sixth reels,
   first, second, third, fourth, fifth and sixth variable speed motor means mechanically coupled respectively to said first, second, third, fourth, fifth and sixth reels, each of said motor means providng a continuous unidirectional torque to the respective one of said reels with which it is associated,
   first, second and third reversible sprocket drives associated respectively with said first tape mechanism, said second tape mechanism and said film mechanism to control the direction and speed of the media fed between said reels associated with each of said mechanisms,
   said three sprocket drives being coupled to each other to drive said media in synchronism on a frame by frame basis,
   said motors maintaining tension on the media throughout the transport of whatever media is fed between the ones of said reels with which said motors are associated,
   said first recording and play back head having at least first and second sound channels to separately record on and play back from first and second tracks of whatever tape is fed past said first head,
   cueing means to provide cueing signals on said first track,
   said third head having at least one sound channel to record on and play back from whatever recording stripe is included on whatever film is fed between said third feed reel and said third take-up reel, and
   mixer means to selectively record on any of said sound recording channels the sound material being read on any one or more others of said sound recording channels.

2. The apparatus of claim 1 wherein said second tape mechanism is multi-track and said second head has first and second sound channels to separately record on and play back from first and second tracks of whatever tape is fed past said second head.

3. The apparatus of claim 2 wherein said first sprocket drive is releasably coupled to said second and third sprocket drive.

4. The apparatus of claim 2 further comprising:
pulse train generating means to provide a pulse train, each pulse of said train corresponding to a frame of media synchronized by said synchronizing means.

5. The apparatus of claim 2 wherein said cueing means comprises:
sync cue means to provide a sync cue signal at selected frames of said first track,
transfer cue means to provide a transfer cue signal, distinct from said sync cue signal, at selected frames of said first track, and
circuit means responsive to a first one of said transfer cue signals to automatically enable said mixer means to transfer information from a selected first one of said tracks to a selected second one of said tracks and responsive to a second one of said transfer cue signals to terminate said transfer of information.

6. The apparatus of claim 1 wherein said first sprocket drive is releasably coupled to said second and third sprocket drive.

7. The apparatus of claim 1 further comprising:
pulse train generating means to provide a pulse train, each pulse of said train corresponding to a frame of media synchronized by said synchronizing means.

8. The apparatus of claim 1 wherein said cueing means comprises:
sync cue means to provide a sync cue signal at selected frames of said first track,
transfer cue means to provide a transfer cue signal, distinct from said sync cue signal, at selected frames of said first track, and
circuit means responsive to a first one of said transfer cue signals to automatically enable said mixer means to transfer information from a selected first one of said tracks to a selected second one of said tracks and responsive to a second one of said transfer cue signals to terminate said transfer of information.

9. The apparatus of claim 3 further comprising:
pulse train generating means to provide a pulse train, each pulse of said train corresponding to a frame of media synchronized by said synchronizing means.

10. The apparatus of claim 3 wherein said cueing means comprises:
sync cue means to provide a sync cue signal at selected frames of said first track,
transfer cue means to provide a transfer cue signal, distinct from said sync cue signal, at selected frames of said first track, and
circuit means responsive to a first one of said transfer cue signals to automatically enable said mixer means to transfer information from a selected first one of said tracks to a selected second one of said tracks and responsive to a second one of said transfer cue signals to terminate said transfer of information.

* * * * *